M. W. SHAPLEY.
Steam-Boiler.
No. 6,501. Reissued June 22, 1875.
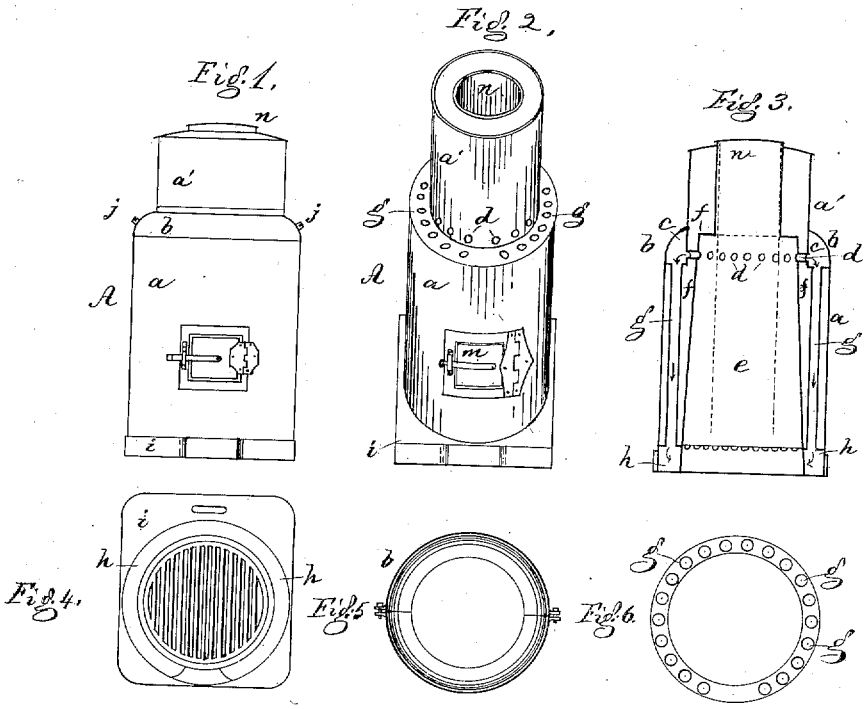
Witnesses.
S. B. Kidder
W. G. Pratt.
Inventor.
Martin W. Shapley
PER Crosby & Gregory
Att'ys

UNITED STATES PATENT OFFICE.

MARTIN W. SHAPLEY, OF BINGHAMTON, NEW YORK.

IMPROVEMENT IN STEAM-BOILERS.

Specification forming part of Letters Patent No. 147,437, dated February 10, 1874; reissue No. 6,501, dated June 22, 1875; application filed June 8, 1875.

*To all whom it may concern:*

Be it known that I, MARTIN W. SHAPLEY, of Binghamton, in the county of Broome and State of New York, have invented certain Improvements in Steam-Boilers, of which the following is a specification:

This invention relates to boilers for generating steam; and consists in an upright boiler having a water-receiving space both above and surrounding the fire-box, a conical fire-box and cross and upright tubes, and a jacket to lead the products of combustion from near the upper end of the conical fire-box into the jacket, and then down through the tubes in the water-space surrounding the fire-box, substantially as described.

Figure 1 in the accompanying drawing is a view of a boiler embodying my invention. Fig. 2 is a perspective view of the same, with the jacket and tube for the receptacle of fuel removed, showing the ends of the cross and upright tubes. Fig. 3 is a vertical transverse section illustrating the conical fire-box and the position of the tubes, and the vertical dotted lines show the tube or chamber for the receptacle of fuel. Fig. 4 is a plan of the base which supports the boiler, showing the fire-grate and lower flues. Fig. 5 is the jacket detached, showing the manner of connecting the two sections; and Fig. 6 is a view, showing the lower end of the boiler and the ends of the upright tubes.

A represents the boiler, composed of an upper and lower portion, *a a'*, the upper part *a'* being smaller in diameter than the lower part *a*, and at the junction between the upper and lower portions is placed a jacket, *b*, which is fitted closely to the two parts, and serves to form a chamber, *c*, into which open the cross-tubes *d*, which lead from near the top of the conical fire-box *e* through the water-space *f* of the boiler, and into the chamber *c*. Other tubes, *g*, lead from this chamber *c* down through the water-space between the conical fire-box and the outer casing of the boiler, and open into a flue, *h*, in base *i*. The jacket is secured in position by screw-bolts *j*, or is otherwise fastened. The fire-box *e* is made conical or contracted toward the crown-sheet, to afford a proper amount of water-space *f* between the two parts *a a'* of the boiler, and to allow the upper end of the fire-box to project within the smaller upper part *a'*, and leave about it a water-space so as to heat the water quickly. The tubes *d* lead from near the upper part of the conical fire-box, and in a horizontal position, or nearly so, into the chamber *c*, formed between the jacket *b* and the junction of the parts *a a'*, and afford passage for the products of combustion from the fire-box into the chamber, and from the chamber such products pass through tubes *g* vertical or nearly so, and arranged within the part *a* of the boiler, and, passing through the tubes *g*, the products of combustion enter a flue, *h*, in the base *i*, and pass from thence into a suitable smoke pipe or stack.

The fire-box being conical, and consequently larger at its base, affords a more extended grate-surface, and more heat can be produced than if the fire-box was throughout of the same size as at its top; and by the arrangement of the conical fire-box, boiler, and tubes, as represented, an unusual amount of heating-surface is obtained, the heat having free access through the cross and upright tubes, and the steam generated passing into the part *a'* of the boiler, the upper portion of which serves as the steam-reservoir.

A large quantity of heat is often lost on account of the foul tubes or flues, for when covered or coated with soot, much more heat is required to generate steam than when the tubes are clean.

In this boiler, the tubes may be quickly and easily cleaned, by simply removing the jacket *b* between the upper and lower portions of the boiler, and the tubes, then all exposed, may be easily cleaned by an ordinary flue-brush or otherwise.

The tubes *g* are arranged in a circular series, and in number more or less.

The fuel may be fed into the fire-box through the door *m*, Fig. 2; or it may be supplied automatically through a tube, *n*, (shown by dotted lines, Fig. 3,) as extending into the conical fire-box; but this may be dispensed with, and the upper portion *a'* of the boiler left to its full capacity for water and steam, and the crown-sheet would then extend across the top of the fire-box, as represented in dotted horizontal lines, Fig. 3.

I claim—

1. The combination of the boiler, constructed substantially as described, and the conical fire-box, with the cross and upright tubes and jacket and chamber, as and for the purpose set forth.

2. The combination of the boiler composed of parts *a a'*, and the cross and upright tubes opening into the chamber *c*, with the removable jacket, whereby the tubes may be quickly and easily cleaned by removing the jacket, substantially as described.

MARTIN W. SHAPLEY

Witnesses:

G. W. GREGORY,

JNO. D. PATTEN.